United States Patent
Tsirkin et al.

(10) Patent No.: US 9,830,286 B2
(45) Date of Patent: Nov. 28, 2017

(54) EVENT SIGNALING IN VIRTUALIZED SYSTEMS

(71) Applicant: Red Hat Israel, Ltd., Raanana (IL)

(72) Inventors: Michael Tsirkin, Raanana (IL); Avi Kivity, Raanana (IL); Dor Laor, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 191 days.

(21) Appl. No.: 13/767,163

(22) Filed: Feb. 14, 2013

(65) Prior Publication Data

US 2014/0229647 A1    Aug. 14, 2014

(51) Int. Cl.
 G06F 13/24    (2006.01)
 G06F 13/16    (2006.01)

(52) U.S. Cl.
 CPC .......... G06F 13/24 (2013.01); *G06F 13/1663* (2013.01)

(58) Field of Classification Search
 CPC ....................................................... G06F 13/24
 USPC ........................................................ 710/260
 See application file for complete search history.

(56) References Cited

U.S. PATENT DOCUMENTS

| | | | | |
|---|---|---|---|---|
| 6,192,440 B1* | 2/2001 | Lowe | ....................... | G06F 13/24 710/260 |
| 6,681,281 B1* | 1/2004 | Maleck | ......................... | 710/261 |
| 2003/0131173 A1* | 7/2003 | Cassidy | ......................... | 710/308 |
| 2006/0015668 A1* | 1/2006 | Nguyen et al. | ............... | 710/269 |
| 2007/0112987 A1 | 5/2007 | Sharma et al. | | |
| 2008/0126648 A1* | 5/2008 | Brownlow et al. | ........... | 710/260 |
| 2010/0169528 A1* | 7/2010 | Kumar | .................. | G06F 13/385 710/263 |
| 2010/0332693 A1* | 12/2010 | Ben-Yehuda et al. | .......... | 710/22 |
| 2011/0047309 A1 | 2/2011 | Brinkmann et al. | | |
| 2011/0179414 A1* | 7/2011 | Goggin et al. | ..................... | 718/1 |
| 2011/0197003 A1 | 8/2011 | Serebrin et al. | | |
| 2011/0202699 A1* | 8/2011 | van Riel | ............... | G06F 9/4812 710/267 |
| 2012/0203947 A1* | 8/2012 | Tsirkin | .................... | G06F 13/24 710/269 |

(Continued)

OTHER PUBLICATIONS

U.S. Appl. No. 13/689,950, entitled "MSI Events Using Dynamic Memory Monitoring", filed Nov. 30, 2012.

(Continued)

*Primary Examiner* — Tim T Vo
*Assistant Examiner* — Phong H Dang
(74) *Attorney, Agent, or Firm* — Lowenstein Sandler LLP

(57) ABSTRACT

A method and system for permitting a guest to program a message-signaled interrupt-based device is disclosed. A hypervisor of a host detects a request by a guest to map an address range of memory of the guest to a message signaled-interrupt capability table associated with a device. The hypervisor maps the message signaled-interrupt capability table from a message signaled-interrupt capability register of a programmable interrupt controller associated with the host to the address range of memory of the guest. The hypervisor detects an attempt by the guest to program the device with the message-signaled interrupt configuration located in the address range of memory of the guest. The hypervisor programs the device with the message-signaled interrupt configuration specified by the guest in the address range of memory of the guest.

17 Claims, 6 Drawing Sheets

(56) References Cited

U.S. PATENT DOCUMENTS

2014/0143771 A1    5/2014   Tsirkin et al.
2014/0149633 A1    5/2014   Tsirkin et al.
2014/0149979 A1    5/2014   Tsirkin et al.
2014/0156894 A1*   6/2014   Tsirkin et al. ............... 710/260
2014/0189182 A1    7/2014   Chew

OTHER PUBLICATIONS

USPTO, Office Action for U.S. Appl. No. 13/689,950, dated Jan. 28, 2015.
USPTO, Final Office Action for U.S. Appl. No. 13/689,950, dated May 20, 2015.
USPTO, Advisory Action for U.S. Appl. No. 13/689,950, dated Jul. 28, 2015.
USPTO, Office Action for U.S. Appl. No. 13/689,950, dated Nov. 4, 2015.
USPTO, Final Office Action for U.S. Appl. No. 13/689,950, dated May 31, 2016.
USPTO, Office Action for U.S. Appl. No. 13/689,950, dated Dec. 27, 2016.

* cited by examiner

EVENT SIGNALING IN VIRTUALIZED SYSTEMS

TECHNICAL FIELD

Embodiments of the present disclosure relate to a computer system, and more specifically, to programming a device (e.g., a PCI device) that employs message-signaled interrupt-based events from a virtual machine (VM).

BACKGROUND

In a virtualized computing system wherein a single virtual machine CPU (VCPU) of a virtual machine (VM) runs on a single host CPU, a device, such as a host device may generate an interrupt or an inter-processor interrupt may be received from a remote CPU of another host. An interrupt is a signal to the CPU or VCPU or an instruction in software that a device which produced the interrupt needs immediate attention. An interrupt signals the CPU or VCPU of a high-priority condition requiring the interruption of the current code that the CPU or VCPU is executing. The CPU or VCPU typically responds by suspending its current activities, saving its state, and executing a small program called an interrupt handler (interrupt service routine, ISR) to deal with the event. This interruption is temporary, and after the interrupt handler finishes, the processor resumes execution of the previous thread.

There are generally two types of interrupt. A hardware interrupt is an electronic alerting signal to the CPU from an external device, either a part of the computer itself such as a disk controller or an external peripheral. For example, pressing a key on the keyboard or moving the mouse triggers hardware interrupts that cause the CPU to read the keystroke or mouse position. Unlike the software type, hardware interrupts are asynchronous and can occur in the middle of instruction execution, requiring additional care in programming. The act of initiating a hardware interrupt is referred to as an interrupt request (IRQ).

A software interrupt is usually caused either by an exceptional condition in the CPU itself, or a special instruction in the instruction set which causes an interrupt when it is executed. The former is often called a trap or exception and is used for errors or events occurring during program execution that are exceptional enough that they cannot be handled within the program itself. For example, if the processor's arithmetic logic unit is commanded to divide a number by zero, this impossible demand will cause a divide-by-zero exception, perhaps causing the CPU to abandon the calculation or display an error message.

Each interrupt typically has its own interrupt handler. The number of hardware interrupts can be limited by the number of interrupt request (IRQ) lines to the CPU, but there may be hundreds of different software interrupts.

If implemented in hardware, an interrupt controller circuit such as a Programmable Interrupt Controller (PIC) may be connected between the interrupting device and the CPU's interrupt pin to multiplex several sources of interrupt onto the one or two CPU lines typically available.

A message-signaled interrupt usually does not use a physical interrupt line. Instead, a device can signal its request for service by sending a short message over some communications medium, typically a computer bus. Rather than using a special message type reserved for interrupts, message-signaled interrupts usually use a memory write message type. PCI computer buses (including serial PCI express and parallel PCI and PCI-X bus types) can use message-signaled interrupts.

PCI devices typically use special messages, called MSI or MSI-X capability structures, to allow operating system software to enable a device to assert an interrupt by means of a message-signaled interrupt. Message-signaled interrupts can allow the device to write a small amount of data to a special address in memory space (e.g., in a message capability register of a PIC). The PIC can deliver the corresponding interrupt to a CPU.

PCI defines two optional extensions to support message-signaled interrupts, MSI and MSI-X. While PCI software is compatible with legacy interrupts, it uses MSI or MSI-X. MSI (first defined in PCI 2.2) permits a device to allocate 1, 2, 4, 8, 16 or 32 interrupts. The device is programmed with an address to write to (e.g., the message address field/register of the message capability register of a PIC), and a 16-bit data word to identify the specific interrupt (e.g., the message data fields/registers of the message capability register of a PIC). The interrupt number is added to the data word to identify the interrupt. Some platforms such as Windows may not use 32 interrupts but rather use up to 16 interrupts.

MSI-X (first defined in PCI 3.0) permits a device to allocate up to 2048 interrupts. The address used by original MSI was found to be restrictive for some architectures. MSI-X allows for a larger number of interrupts and gives each one a separate target address and data word. Devices with MSI-X may not necessarily support 2048 interrupts but typically support at least 64 which is double the maximum MSI interrupts.

In a virtualized environment, a virtual machine does not have direct access to the PIC of the host. Events signaled from a physical device to a guest of a virtual machine are handled by an intervening software layer providing the virtualization, commonly referred to as a hypervisor (also known as a virtual machine monitor (VMM)).

The hypervisor emulates a virtual programmable interrupt controller (VPIC). When the guest makes a request to the VPIC to program an emulated MSI/MSI-X virtual device, the hypervisor traps the request and programs the PIC of the host with fields from an MSI/MSI-X capability table to be written to the MSI/MSI-X capability register of a corresponding hardware device of the host.

When the hardware device of the host writes an MSI/MSI-X message containing an MSI/MSI-X capability table to the specified address in the PIC to raise a MSI/MSI-X interrupt, the hypervisor, in turn, traps the message and forwards the MSI/MSI-X capability table to the specified address in the VPIC, which is then handled by the guest.

Unfortunately, the guest is not aware of configurations stored in MSI/MSI-X capability registers of a PIC or VPIC and what addresses the PIC of the host has selected for a specific device. Accordingly, both the indirect programming of a real device of a host by a guest and subsequent servicing of an MSI/MSI-X event raised by the real device of a host by a VPIC of guest typically result in significant overhead and processing time.

DETAILED DESCRIPTION

Figure 1:
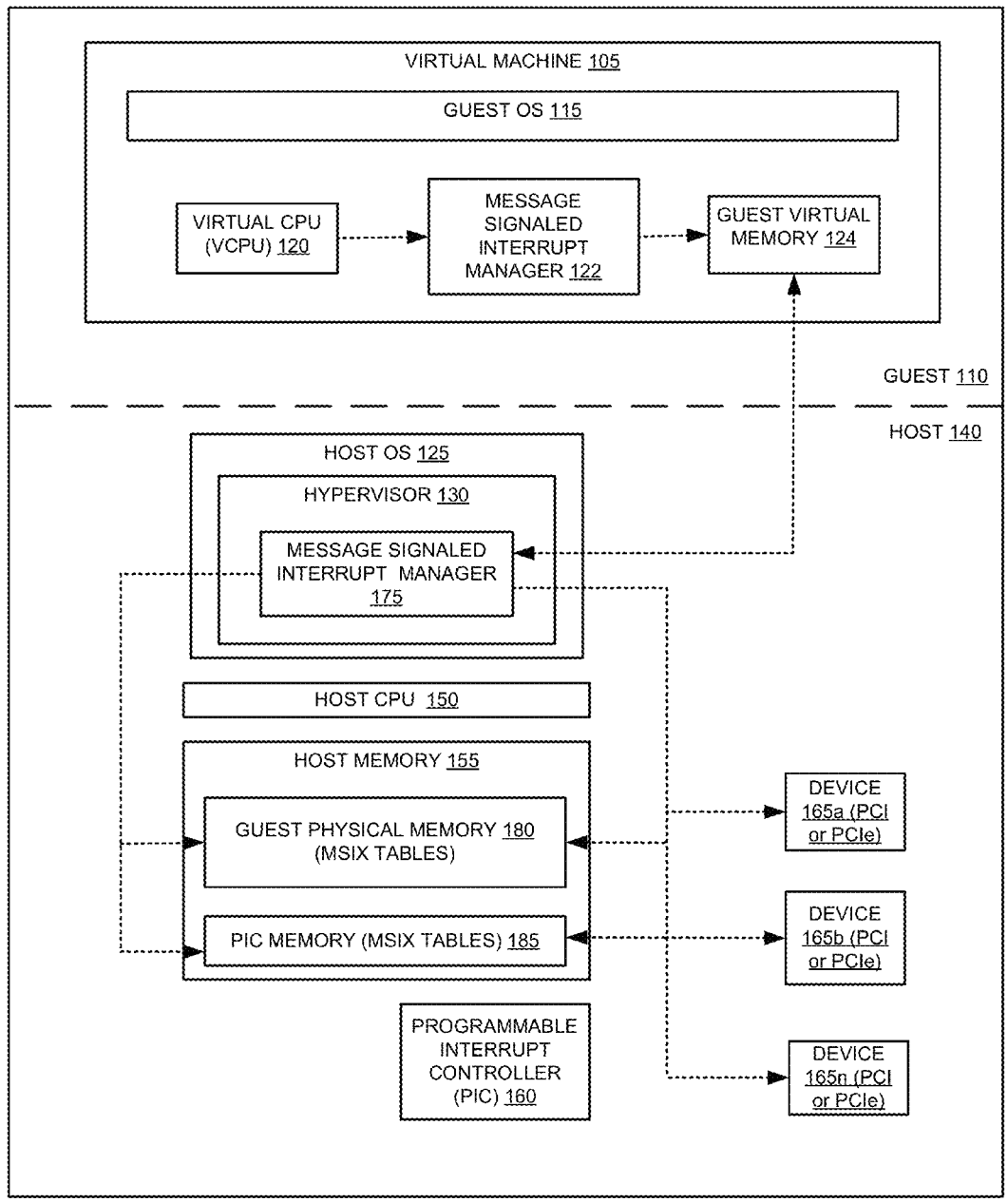
FIG. 1 is a block diagram that illustrates an example computing system in which examples of the present disclosure may operate.

Methods and systems for permitting a guest to program a message-signaled interrupt-based device are disclosed. A hypervisor of a host detects a request by a guest to map an address range of memory of the guest to a message signaled-interrupt capability table (e.g., corresponding to an MSI or MSI-X interrupt) associated with a device (e.g., a PCI device). In an example, the device comprises a hardware device associated with a host. The hypervisor maps the message signaled-interrupt capability table from a message signaled-interrupt capability register of a programmable interrupt controller associated with the host to the address range of memory of the guest. The hypervisor detects an attempt by the guest to program the device with the message-signaled interrupt configuration located in the address range of memory of the guest. The hypervisor programs the device with the message-signaled interrupt configuration specified by the guest in the address range of memory of the guest. In an example, the hypervisor programs the device with the message-signaled interrupt configuration in response to the request.

In an example, the memory of the guest may be mapped by the hypervisor to guest physical memory. In an example, guest physical memory may be located by the hypervisor in an alternate address range from that designated by the programmable interrupt controller. In another example, guest physical memory may be located by the hypervisor in the same address range as that that designated by the message signaled-interrupt capability register.

In an example, the message-signaled interrupt configuration specified by the guest may differ from a configuration selected by the hypervisor for the same device.

In an example, the hypervisor may detect from the guest a second request to rescind access to the message signaled-interrupt capability table associated with the device. In response, the hypervisor may un-map the message signaled-interrupt capability table associated with the device from address range of memory of the guest. In an example, un-mapping may further comprises re-mapping the message signaled-interrupt capability table to the message signaled-interrupt capability register of the programmable interrupt controller associated with the host.

In an example, a guest may transmit to a hypervisor of a host a request to map an address range of memory of the guest to a message signaled-interrupt capability table associated with a device. The guest may detect a mapping by the hypervisor of the message signaled-interrupt capability table from a message signaled-interrupt capability register of a programmable interrupt controller associated with the host to the address range of memory of the guest. The guest may attempt to program the device with the message-signaled interrupt configuration located in the address range of memory of the guest. Programming the device by the guest may comprise writing a message-signaled interrupt configuration for the device to the memory of the guest. The guest may program the device with the message-signaled interrupt configuration separate from the request. In another example, the guest may program the device with the message-signaled interrupt configuration along with the request. Programming the device by the guest may further comprise a write by the guest of a message-signaled interrupt enable bit for the device for masking or unmasking an event raised by the device.

In an example, the message-signaled interrupt configuration specified by the guest may differ from a configuration selected by the hypervisor for the same device.

In an example, the guest may transmit to the hypervisor a second request to rescind access to the message signaled-interrupt capability table associated with the device. The guest may detect an un-mapping by the hypervisor of the message signaled-interrupt capability table associated with the device from address range of memory of the guest. The un-mapping may further comprise re-mapping the message-signaled interrupt configuration to the message signaled-interrupt capability register of the programmable interrupt controller associated with the host.

In an example, the transmitting, detecting, and programming by the guest may be implemented by a guest device driver supplied by the hypervisor.

In an example, the write of data to the PCI device may comprise writing a message-signaled interrupt (MSI) configuration or an extended message-signaled interrupt (MSI-X) configuration to the to the PCI device.

Accordingly, an efficient method and system that enables a guest to have direct access to an MSI or MSI-X capability table of a PCI device for programming of MSI or MSI-X interrupts associated with the device. The method described herein improves processing time by avoiding the overhead associated with indirect guest-to-host device programming performed by a hypervisor.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing system 100 in which examples of the present disclosure may operate. The computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor 130 that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory (e.g., guest virtual memory 124), virtual CPU (e.g., one or more VCPUs 120), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 110, etc.

In one example, the computing system 100 runs a hypervisor 130 to virtualize access to the underlying host hardware 135 of a host 140, making the use of the virtual machine 105 transparent to the guest 110 and the users of the computing system 100. In one example, the hypervisor 130 may support the virtual machine 105. In one example, the hypervisor 130 is part of a host operating system (OS) 125 of the host 140.

In one example, the computing system 100 also includes hardware components (host hardware) including a host central processing unit (CPU) 150. The computing system 100 may also include host memory 155, a programmable interrupt controller (PIC) 160, PCI-based input/output (I/O) devices 165a-165n and other hardware devices 165a-165n.

In a virtualized environment, a virtual machine 105 may not have direct access to the PIC 160 of the host 140. Control of the message-signaled interrupt capability table of a physical device (e.g., 165a) may be indirectly handled by the intervening hypervisor 130. In one example, a message signaled interrupt manager 122 under the control of a VCPU 120 of the guest 110 is aware of the hypervisor 130 (i.e., paravirtualized) and is configured to a make a request to the hypervisor 130 to map an address range of memory of the guest 110 (e.g., guest virtual memory 124) to a message signaled-interrupt capability table associated with the PCI devices 165a.

A corresponding message signaled interrupt manager 175 running on the hypervisor 130 of the host CPU 150 is configured to detect the request by the message signaled interrupt manager 122 of the guest 110 to map the message signaled-interrupt capability table from a message signaled-interrupt capability register of a programmable interrupt controller associated with the host (e.g., PCI memory 185) to the address range of memory of the guest 110 (e.g., guest physical memory 180).

The message signaled interrupt manager 122 of the guest 110 is further configured to attempt to program the device (e.g., 165a) with the message-signaled interrupt configuration located in the address range of memory of the guest 110 (e.g., guest virtual memory 124). The message signaled interrupt manager 175 is further configured to map the configuration located in the address range of memory of the guest 110 (e.g., guest virtual memory 124) to the physical address range of memory of the guest 110 (e.g., guest physical memory 180).

The message signaled interrupt manager 175 is further configured to program the PCI device (e.g., 165a) with the message-signaled interrupt configuration specified by the guest 110 in the address range of memory of the guest (e.g., guest physical memory 180) in accordance with the methods described in connection with FIG. 3 and FIG. 5. This permits the message signaled interrupt manager 122 under the control of a VCPU 120 of the guest 110 to receive and respond to message-signaled interrupt event notifications submitted by the one or more PCI devices 165a-165n directly from the guest virtual memory 124. Examples of message-signaled interrupt event notifications include a notification that a packet has been transmitted or received from a network interface card (NIC), a notification that a request to perform a disk I/O operation has been completed, a notification that an image has been output to a display from a video card, a notification that data was sent on a serial port from a serial card, etc.

In an example, the message signal interrupt manager 122 of the guest 110 may be configured to transmit to the hypervisor 130 a second request to rescind access to the message signaled-interrupt capability table associated with the PCI device (e.g., 165b). The message signal interrupt manager 175 of the hypervisor 130 may be configured to un-map the message signaled-interrupt capability table associated with the PCI device (e.g., 165b) from address range of the memory of the guest 110 (e.g., guest virtual memory 124). Un-mapping may comprise the message signal interrupt manager 175 of the hypervisor 130 re-mapping the message-signaled interrupt configuration to the message signaled-interrupt capability register (e.g., PCI memory 185) of the programmable interrupt controller 160 associated with the host 140.

Figure 2:
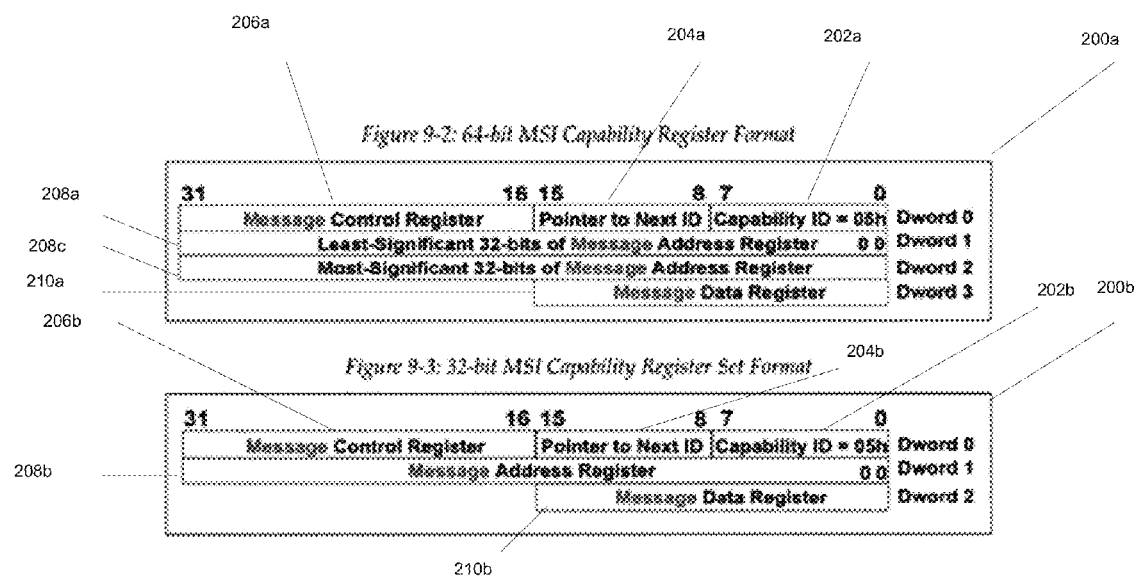
FIG. 2 shows example formats of message-signaled interrupt capability tables corresponding to MSI-X and MSI interrupt messages raisable by PCI devices, respectively.

FIG. 2 shows example formats of message-signaled interrupt capability tables associated with MSI-X (200a) and MSI (200b) interrupts raisable by PCI devices, respectively. Before a PCI device (e.g., 165b) can raise a message-signaled interrupt, the PCI device (e.g., 165b) needs be detected by the PIC 160 and programmed by the PIC 160 as to which memory range of the PIC 160 to write message-signaled interrupts (MSIs) and how many and types of MSIs can be raised by the PCI device (e.g., 165b). This information may be programmed by the PIC 160 through memory write transactions to the PCI device (e.g., 165b). The PIC 160 may select the number of and types of MSI events that a PCI device (e.g., 165b) can raise by specifying data in a MSI/MSI-X capability table 200a, 200b contained in its message-signaled interrupt capability register. The information contained in the MSI/MSI-X capability table comprises a target memory address and the data values to be written to the target memory address.

For a PCI device, the fields of the message-signaled interrupt capability tables/registers 200a, 200b comprise a capability ID field 202a, 202b that identifies an MSI/MSI-X capable PCI device (e.g., 165b), and is always set to 05 hex for MSI and 11 hex for MSI-X, respectively; a pointer to the next capability (e.g. a capability unrelated to the MSI functionality) in the capability list 204a, 204b; a message control register 206a, 206b which comprises an MSI enable bit for masking/enabling/disabling the raising of MSI/MSI-X messages and fields for indicating whether the device (e.g., 165b) is multiple message capable/enabled and/or 64 bit address capable; a message address register 208a (and 208b for 64 bit message enabled devices) operable to contain the address of the memory write of the PIC 160 used when a device (e.g., 165b) delivers an interrupt request to the PIC 160; and a message data register 210a, 210b to contain data identifying a specific interrupt type.

At boot time, configuration software of the host 140 (or of the hypervisor 130 or the guest 110) can detect and program each PCI-capable device (e.g. 165b) using an MSI/MSI-X capability table. The configuration software scans the PCI bus(es) and discovers devices. When a PCI express device is discovered, the configuration software reads the capability list pointer 204a, 204b to obtain the location of the first capability register within a chain of registers. The software searches the capability register sets until it discovers an MSI/MSI-X capability register set (Capability ID of 05 hex/11 hex, respectively). The configuration software then assigns a memory address to the device's message address register 208*a*, 208*b*. If the MSI-X capability is used, it is programmed in a similar way using the on-device MSI-X capability and MSI-X table structure (not shown). The configuration software then allocates a number of messages equal to or less than what the device supports or more messages (one or more messages). The configuration software writes a base message data patterns into the device's message data register 210*a*, 210*b*. Finally, the configuration software sets the MSI enable bit in the devices message control register 206*a*, 206*b*, thereby enabling the device to generate interrupts using MSI memory writes.

The data written to the designated address range 180 by the hypervisor 130 may comprise an MSI configuration or an MSI-X configuration. In an example, the memory instruction manager 175 is configured to manage the memory range designations and assignments. In this example, the memory instruction manager 175 may reserve different memory ranges for different types of devices. For example, when a plurality of PCI devices (e.g., 165*a*-165*n*) is configured to raise message-signaled interrupt events intended for processing by the message signaled interrupt manager 122, the memory instruction manager 175 may be configured to select a first set of devices (e.g., 165*a*-165*c*) for writing the message-signaled interrupt capability table to the address range of physical memory of the guest 110 (e.g., guest physical memory 180 (e.g., a video card, a NIC, a sound card, etc., that are PCI capable)), a second set of devices (e.g., 165*d*-165*h*) for writing the message-signaled interrupt capability table to an address range of host memory 155 (e.g., a printer, a display etc., that are not PCI capable) specified by the hypervisor 130, and a remaining set of devices (e.g., 165*i*-165*n*) for writing the message-signaled interrupt capability table to an address range designated by the message signaled-interrupt capability register (e.g., the PIC memory 185 (e.g., a printer, a display etc., that are PCI capable)).

Figure 3:
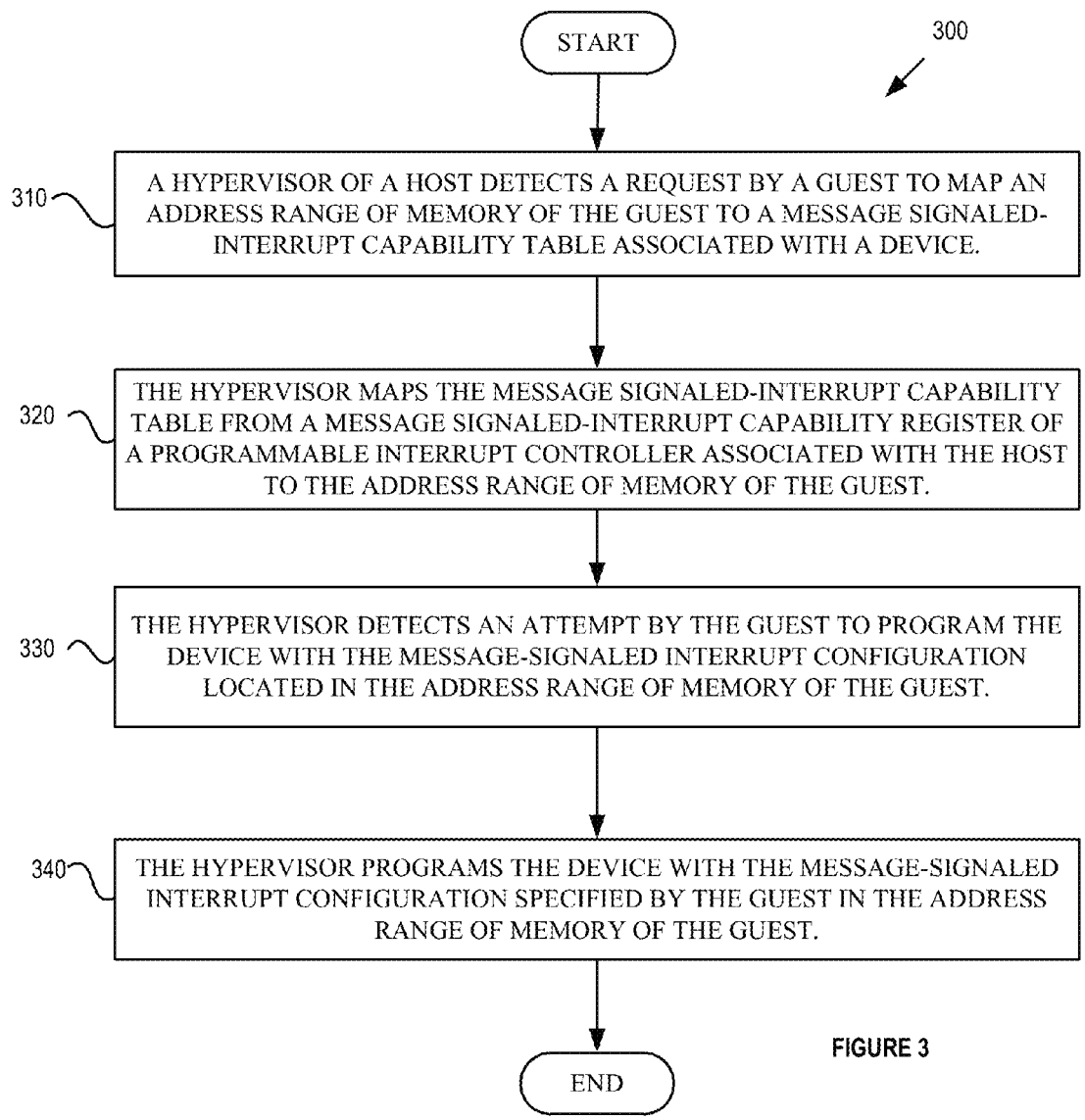
FIG. 3 is a flow diagram illustrating an example of a method for programming a device that employs message-signaled interrupt-based events from a virtual machine (VM).

FIG. 3 is a flow diagram illustrating an example of a method 300 for programming a device that employs message-signaled interrupt-based events from a virtual machine (VM) 105. The method 300 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 300 is performed by the message signaled-interrupt manager 175 of the hypervisor 130 of FIG. 1.

As shown in FIG. 3, at block 310, the hypervisor 130 detects a request by the guest 110 (i.e., the message signaled interrupt manager 122 under the control of the VCPU 120) to have access to a message signaled-interrupt capability table associated with a PCI device (e.g., 165*b*). In an example, the device (e.g., 165*b*) may comprise a hardware PCI device associated with the host 140. At block 320, the hypervisor 130 maps the message signaled-interrupt capability table associated with the PCI device (e.g., 165*b*) from a message signaled-interrupt capability register of the programmable interrupt controller 160 associated with the host 140 to an address range of memory of the guest 110 (e.g., guest virtual memory 124). In an example, the memory of the guest (e.g., guest virtual memory 124) may be mapped to the guest physical memory 180. In an example, the guest physical memory 180 may be located by the hypervisor 130 in an alternate address range from that designated by the programmable interrupt controller 160 (e.g., the PIC memory 185). In another example, the guest physical memory 180 may be located by the hypervisor 130 in the same address range as that that designated by the message signaled-interrupt capability register (e.g., the PIC memory 185).

At block 330, the hypervisor 130 detects an attempt by the guest 110 to program the PCI device (e.g., 165*b*) with the message-signaled interrupt configuration located in the address range of memory of the guest 110 (e.g., guest virtual memory 124). In an example, the message-signaled interrupt configuration specified by the message signaled interrupt manager 122 of the guest 110 may differ from a configuration selected by hypervisor 130 for the same PCI device (e.g., 165*b*).

At block 340, the hypervisor 130 programs the PCI device (e.g., 165*b*) with the message-signaled interrupt configuration specified by the guest 110 in the address range of memory of the guest 110 ((e.g., guest virtual memory 124). In an example, the hypervisor 130 programs the PCI device (e.g., 165*b*) with the message-signaled interrupt configuration in response to the request. In an example, the data written to the PCI device (e.g., 165*b*) includes information defining the specific event that may be raised. In an example, the write of data to the PCI device (e.g., 165*b*) comprises writing a message-signaled interrupt (MSI) configuration or an extended message-signaled interrupt (MSI-X) configuration to the to the PCI device (e.g., 165*b*).

Figure 4:
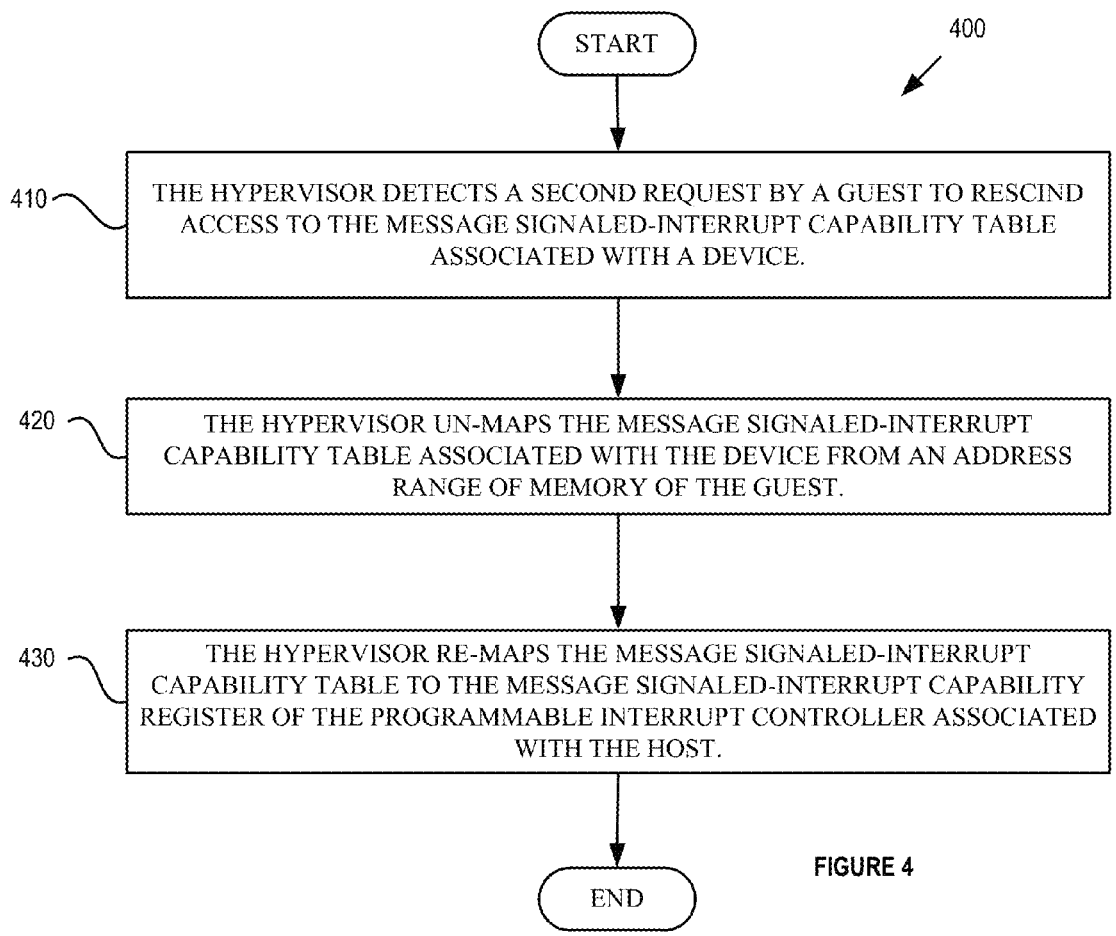
FIG. 4 is a flow diagram illustrating an example of a method for de-programming a device that employs message-signaled interrupt-based events from a virtual machine (VM).

FIG. 4 is a flow diagram illustrating an example of a method 400 for de-programming a device that employs message-signaled interrupt-based events from a virtual machine (VM) 105. The method 400 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 400 is performed by message signaled-interrupt manager 175 of the hypervisor 130 of FIG. 1.

As shown in FIG. 4, in block 410, the hypervisor 130 detects a second request by the guest 110 (i.e., the message signaled interrupt manager 122 under the control of the VCPU 120) to rescind access to the message signaled-interrupt capability table associated with a PCI device (e.g., 165*b*). In block 420, the hypervisor 130 un-maps the message signaled-interrupt capability table associated with the PCI device (e.g., 165*b*) from the address range of memory of the guest 110 (e.g., guest virtual memory 124). In block 430, the hypervisor 130 re-maps the message signaled-interrupt capability table to the message signaled-interrupt capability register (e.g., the PIC memory 185) of the programmable interrupt controller 160 associated with the host 140.

In an example, when a plurality of PCI devices (e.g., 165*a*-165*n*) are configured to raise message-signaled interrupt events intended for processing by the message signaled interrupt manager 122, the hypervisor 130 may be configured to select a first set of devices (e.g., 165*a*-165*c*) for writing the message-signaled interrupt capability table to the address range of physical memory of the guest 110 (e.g., guest physical memory 180), a second set of devices (e.g., 165*d*-165*h*) for writing the message-signaled interrupt capability table to an address range of physical memory (e.g., host memory 155) specified by the hypervisor 130, and a remaining set of devices (e.g., 165*i*-165*n*) for writing the message-signaled interrupt capability table to an address range designated by the message signaled-interrupt capability register (e.g., the PIC memory 185).

When a set of devices (e.g., 165*d*-165*h*) is configured to write the message-signaled interrupt capability table to an address range specified by the hypervisor 130, the hypervisor 130 may be configured to trap an attempt by the programmable interrupt controller 160 to program a message-signaled interrupt capability table. The hypervisor 130 may be further configured map the trapped message-signaled interrupt capability table to a message-signaled interrupt configuration located in an address range of physical memory (e.g., host memory 155) specified by the hypervisor 130. The hypervisor 130 may be further configured to program the set of devices (e.g., 165d-165h) with a message-signaled interrupt configuration located in the address range of physical memory (e.g., host memory 155) specified by the hypervisor 130.

In an example, when the measured frequency of detected events from a set of devices (e.g., 165a-165c) is equal to or above a first frequency threshold, the hypervisor 130 may select a first set of devices for writing the message-signaled interrupt capability table to the address range of physical memory of the guest 110 (e.g., guest physical memory 180). When the measured frequency of detected events from a set of devices (e.g., 165d-165h) is equal to or above a second frequency threshold lower than the first frequency threshold, the hypervisor 130 may select the second set (e.g., 165d-165h) of devices for writing the message-signaled interrupt capability table to the address range of physical memory (e.g., host memory 155) by the hypervisor 130. When the measured frequency of detected events from a set of devices (e.g., 165i-165n) is below the second frequency threshold, the hypervisor 130 may select the third set (e.g., 165i-165n) of devices for writing the message-signaled interrupt capability table to the address range designated by the message signaled-interrupt capability register (e.g., the PIC memory 185).

In an example, the measured frequency for a PCI device (e.g., 165a) may be determined by counting the number of events originating from that PCI device (e.g., 165a) intended for the VCPU 120 over a period of time. In an example, the period of time may be any suitable amount of time, such as for, example, a one second time frame.

Figure 5:
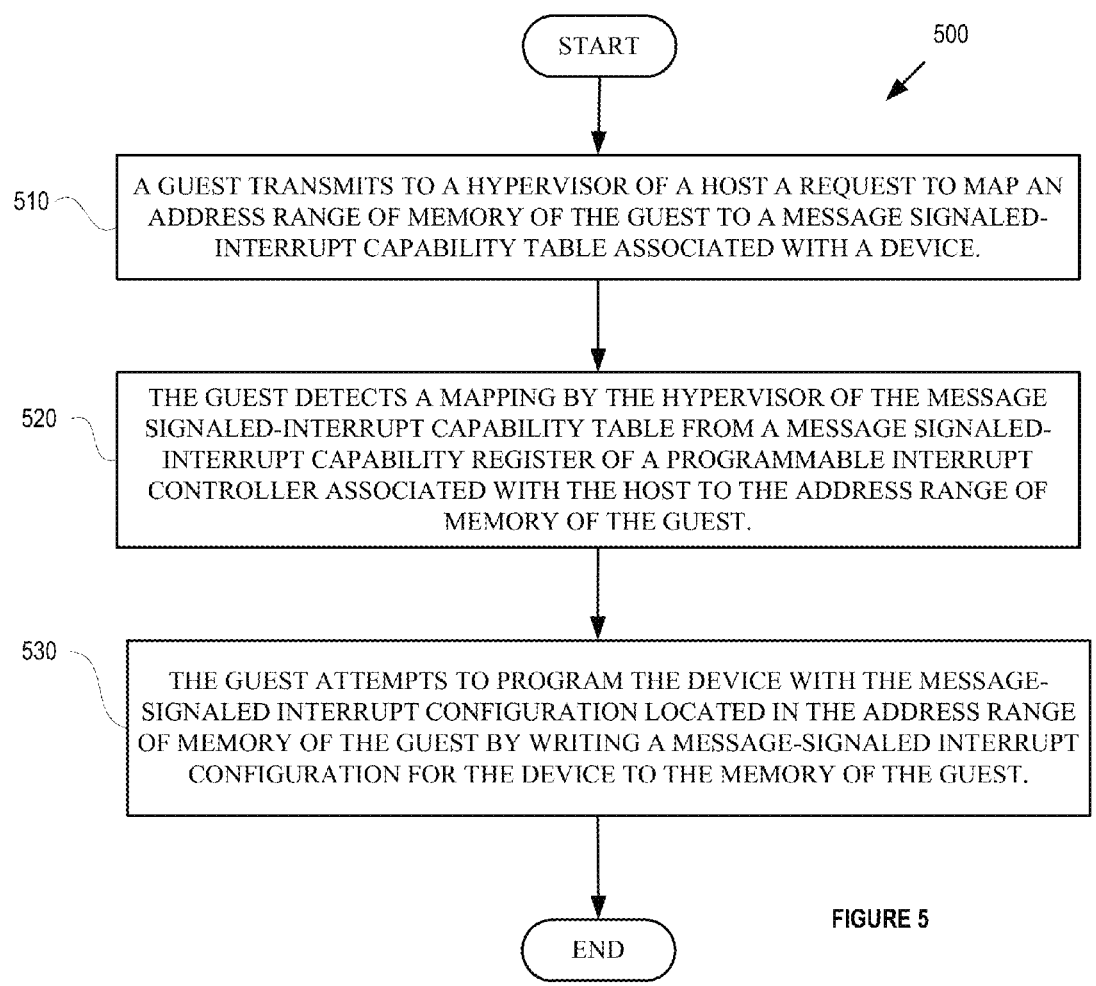
FIG. 5 is a flow diagram illustrating another example of a method for programming a device that employs message-signaled interrupt-based events from a virtual machine (VM).

FIG. 5 is a flow diagram illustrating an example of a method 500 for programming a device that employs message-signaled interrupt-based events from a virtual machine (VM) 105. The method 500 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 500 is performed by the message signaled interrupt manager 122 of the guest 110 of FIG. 1.

As shown in FIG. 3, at block 510, a guest 110 (i.e., the message signaled interrupt manager 122 under the control of the VCPU 120) transmits a request to have access to a message signaled-interrupt capability table associated with a PCI device (e.g., 165b) to a hypervisor 130 of a host 140. In an example, the PCI device (e.g., 165b) may comprise a hardware device associated with the host. At block 520, the guest 110 detects a mapping by the hypervisor 130 of the message signaled-interrupt capability table to a message signaled-interrupt capability register of the programmable interrupt controller 160 associated with the host 140 to an address range of memory of the guest 110 (e.g., guest virtual memory 124).

At block 320, the hypervisor 130 maps the message signaled-interrupt capability table associated with the PCI device (e.g., 165b) from a message signaled-interrupt capability register of the programmable interrupt controller 160 associated with the host 140 to an address range of memory of the guest 110 (e.g., guest virtual memory 124). In an example, the memory of the guest 110 (e.g., the guest virtual memory 124) may be mapped to the guest physical memory 180. In an example, the guest physical memory 180 may be located by the hypervisor 130 in an alternate address range from that designated by the programmable interrupt controller 160 (e.g., the PIC memory 185). In another example, the guest physical memory 180 may be located by the hypervisor 130 in the same address range as that that designated by the message signaled-interrupt capability register (e.g., the PIC memory 185).

At block 530, the guest 110 attempts to program the PCI device (e.g., 165b) with the message-signaled interrupt configuration located in the address range of memory of the guest 110 by writing a message-signaled interrupt configuration for the PCI device (e.g., 165b) to the memory of the guest 110 (e.g., guest virtual memory 124). Programming the device (e.g., 165b) by the guest 110 may comprise writing a message-signaled interrupt configuration for the device (e.g., 165b) to the memory of the guest 110 (e.g., the guest virtual memory 124).

In an example, the guest 110 may attempt to program the device (e.g., 165b) with the message-signaled interrupt configuration separate from the request. In another example, the guest 110 may attempt to program the device (e.g., 165b) with the message-signaled interrupt configuration along with the request. Programming the device by the guest 110 may comprise a write by the guest 110 of a message-signaled interrupt enable bit for the PCI device (e.g., 165b) for masking or unmasking an event raised by the PCI device (e.g., 165b).

In an example, the message-signaled interrupt configuration specified by the guest 110 may differ from a configuration selected by the hypervisor 130 for the same PCI device (e.g., 165b).

In an example, the transmitting, detecting, and programming by the guest 110 may be implemented by a guest device driver (not shown) supplied by the hypervisor 130.

In response to the guest 110 attempting to program the PCI device (e.g., 165b), the hypervisor 130 programs the device (e.g., 165b) with the message-signaled interrupt configuration specified by the guest 110 in the address range of memory of the guest 110 (e.g., guest virtual memory 124). In an example, the hypervisor 130 programs the PCI device (e.g., 165b) with the message-signaled interrupt configuration in response to the request. In an example, the data written to the PCI device (e.g., 165b) includes information defining the specific event that may be raised. In an example, the write of data to the PCI device (e.g., 165b) comprises writing a message-signaled interrupt (MSI) configuration or an extended message-signaled interrupt (MSI-X) configuration to the to the PCI device (e.g., 165b).

In an example, the message signal interrupt manager 122 of the guest 110 may transmit to the hypervisor 130 a second request to rescind access to the message signaled-interrupt capability table associated with the PCI device (e.g., 165b). The message signal interrupt manager 122 of the guest 110 may then detect an un-mapping by the hypervisor 130 of the message signaled-interrupt capability table associated with the PCI device (e.g., 165b) from address range of the memory of the guest 110 (e.g., guest virtual memory 124). Un-mapping may comprise the hypervisor 130 re-mapping the message-signaled interrupt configuration to the message signaled-interrupt capability register (e.g., PCI memory 185) of the programmable interrupt controller 160 associated with the host 140.

Figure 6:
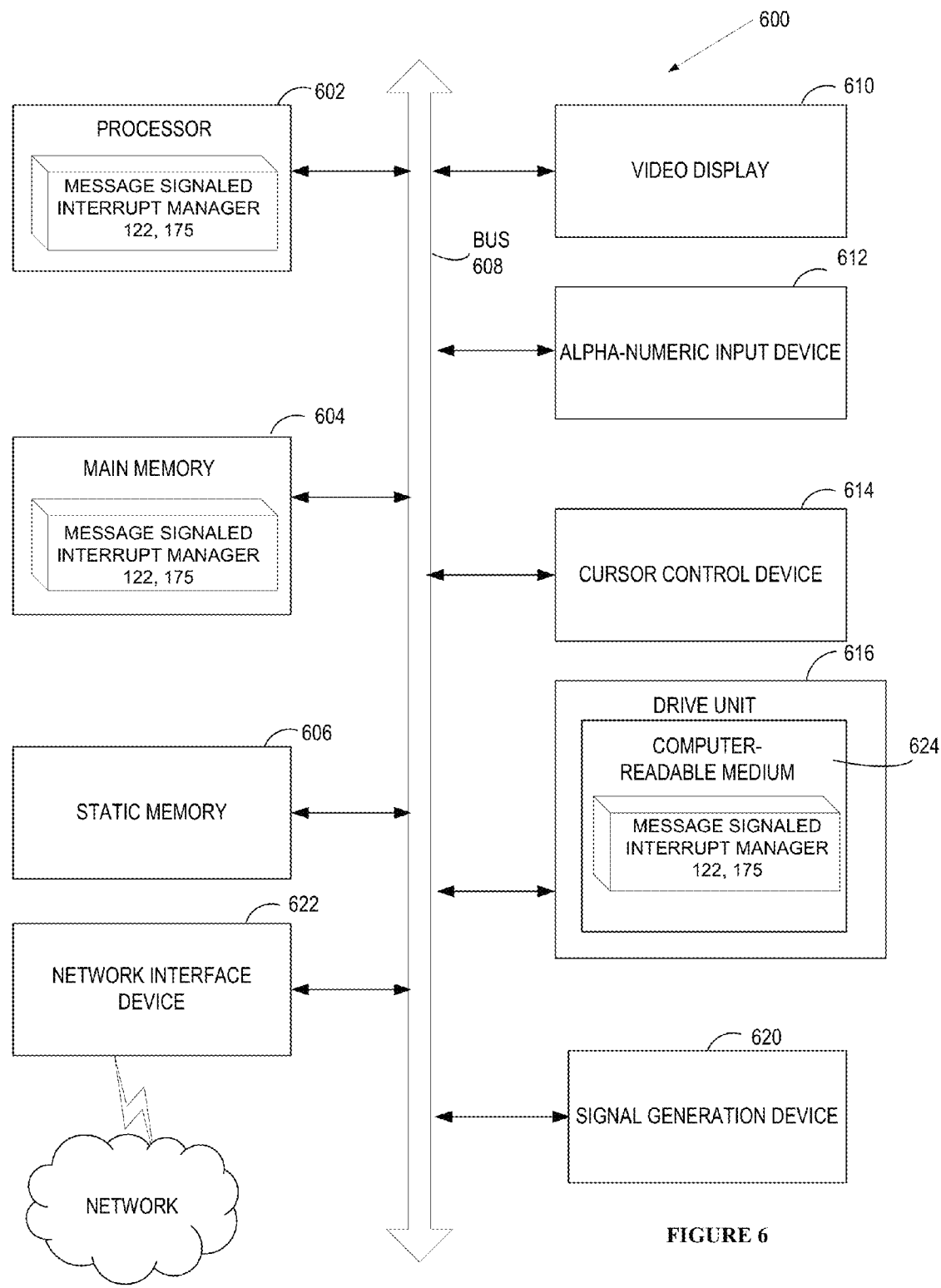
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The message signaled interrupt managers 122, 175 shown in FIG. 1 may be executed by processor 602 configured to perform the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions of the message signaled interrupt managers 122, 175) embodying any one or more of the methodologies or functions described herein. The instructions of the message signaled interrupt managers 122, 175 may also reside, completely or at least partially, within the main memory 604 and/or within the processor 602 during execution thereof by the computer system 600, the main memory 604 and the processor 602 also constituting computer-readable media. The instructions of the message signaled interrupt managers 122, 175 may further be transmitted or received over a network via the network interface device 622.

While the computer-readable storage medium 624 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   detecting, by a processing device executing a hypervisor of a host, a plurality of events signaled to a guest of a virtual machine by at least one of a first device or a second device;
   determining, by the processing device, a guest-event frequency in view of a number of the plurality of events signaled to the guest during a time period;
   determining whether the guest-event frequency satisfies a first threshold or a second threshold, wherein the second threshold is less than the first threshold;
   responsive to the guest-event frequency satisfying the first threshold:
     selecting, by the processing device, the first device to write a message signaled-interrupt capability table to a memory of the guest; and
     mapping, by the processing device, the message signaled-interrupt capability table to a first address range of the memory; and
   responsive to the guest-event frequency satisfying the second threshold:
     selecting, by the processing device, the second device to write the message signaled-interrupt capability table to the memory of the guest; and
     mapping the message signaled-interrupt capability table to a second address range of the memory.

2. The method of claim 1 further comprising:
   detecting, by the processing device, an attempt by the guest to program the selected device with a message-signaled interrupt configuration located in the memory of the guest; and
   programming, by the processing device, the selected device with the message-signaled interrupt configuration.

3. The method of claim 1, wherein the hypervisor maps the memory of the guest to a guest physical memory.

4. The method of claim 1, further comprising:
   responsive to the guest-event frequency not satisfying either of the first threshold or the second threshold:
   designating an alternate address range of the memory by a programmable interrupt controller; and
   mapping the message signaled-interrupt capability table to the alternate address range of the memory.

5. The method of claim 1, wherein the first address range of the memory is specified by a message signaled-interrupt capability register.

6. The method of claim 1, wherein the guest specifies a message-signaled interrupt configuration for the selected device that differs from a configuration selected by the hypervisor for the selected device.

7. The method of claim 1, further comprising:
   detecting by the processing device, a request by the guest to rescind access to the message signaled-interrupt capability table associated with the selected device; and
   un-mapping by the processing device, the message signaled-interrupt capability table associated with the selected device from the memory of the guest.

8. The method of claim 7, further comprising re-mapping the message signaled-interrupt capability table to a message signaled-interrupt capability register of a programmable interrupt controller associated with the host.

9. An apparatus comprising:
   a memory; and
   a processing device, operatively coupled to the memory, to execute a hypervisor to:
     detect a plurality of events signaled to a guest of a virtual machine by at least one of a first device or a second device;
     determine a guest-event frequency in view of a number of the plurality of events signaled to the guest during a time period;
     determine whether the guest-event frequency satisfies a first threshold or a second threshold, wherein the second threshold is less than the first threshold;
     responsive to the guest-event frequency satisfying the first threshold:
       select the first device to write a message signaled-interrupt capability table to the memory; and
       map, via the hypervisor, the message signaled-interrupt capability table to a first address range of the memory; and
     responsive to the guest-event frequency satisfying the second threshold:
       select the second device to write a message signaled-interrupt capability table to the memory; and
       map, via the hypervisor, the message signaled-interrupt capability table to a second address range of the memory.

10. The apparatus of claim 9 wherein the processing device is further to:
    detect, via the hypervisor, an attempt by the guest to program the selected device with a message-signaled interrupt configuration located in the memory of the guest; and
    program, via the hypervisor, the selected device with the message-signaled interrupt configuration.

11. The apparatus of claim 9 further comprising a message signaled-interrupt capability register to specify the first address range of the memory.

12. The apparatus of claim 9 wherein the processing device is further to:
    detect, via the hypervisor, a request by the guest to rescind access to the message signaled-interrupt capability table associated with the selected device; and
    un-map, via the hypervisor, the message signaled-interrupt capability table associated with the selected device from the memory of the guest.

13. A non-transitory computer-readable storage medium having stored therein instructions which, when executed by a processing device, cause the processing device to:
    detect by the processing device, via a hypervisor, a plurality of events signaled to a guest of a virtual machine by at least one of a first device or a second device;
    determine a guest-event frequency in view of a number of the plurality of events signaled to the guest during a time period;
    determine whether the guest-event frequency satisfies a first threshold or a second threshold, wherein the second threshold is less than the first threshold;

responsive to the guest-event frequency satisfying the first threshold:
    select the first device to write a message signaled-interrupt capability table to the memory; and
    map, via the hypervisor, the message signaled-interrupt capability table to a first address range of the memory; and
responsive to the guest-event frequency satisfying the second threshold:
    select the second device to write a message signaled-interrupt capability table to the memory; and
    map, via the hypervisor, the message signaled-interrupt capability table to a second address range of the memory.

14. The non-transitory computer-readable storage medium of claim 13 wherein the instructions further cause the processing device to:
    detect, via the hypervisor, an attempt by the guest to program the selected device with a message-signaled interrupt configuration located in the memory of the guest; and
    program, via the hypervisor, the selected device with the message-signaled interrupt configuration.

15. The non-transitory computer-readable storage medium of claim 13 wherein the first address range of the message is specified by a signaled-interrupt capability register.

16. The non-transitory computer-readable storage medium of claim 13 wherein the instructions further cause the processing device to:
    detect, via the hypervisor, a request by the guest to rescind access to the message signaled-interrupt capability table associated with the selected device; and
    un-map, via the hypervisor, the message signaled-interrupt capability table associated with the selected device from the memory of the guest.

17. The non-transitory computer-readable storage medium of claim 16 wherein the instructions further cause the processing device to re-map the message signaled-interrupt capability table to a message signaled-interrupt capability register of a programmable interrupt controller associated with the host.

* * * * *